May 7, 1968  F. DUERDEN ET AL  3,382,322
APPARATUS FOR ELECTRICALLY IDENTIFYING
ONE OF A NUMBER OF STATIONS
Filed Dec. 7, 1964  6 Sheets-Sheet 2
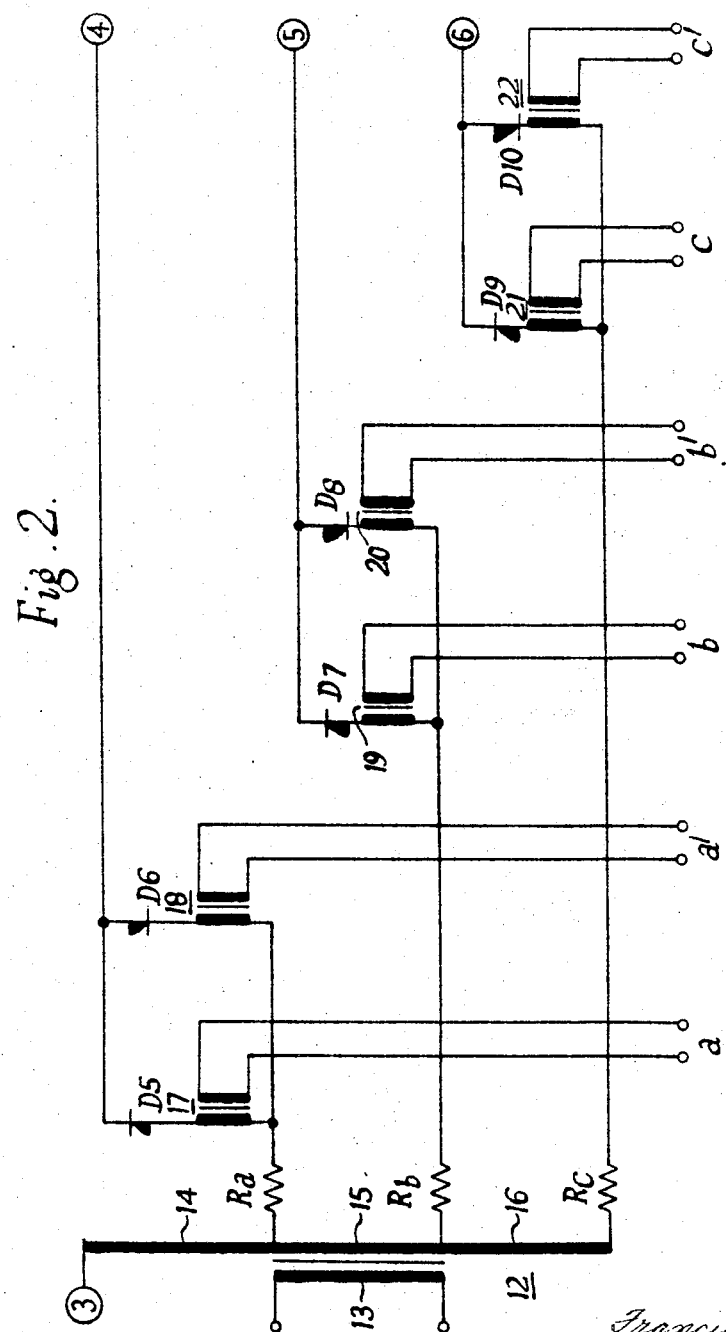

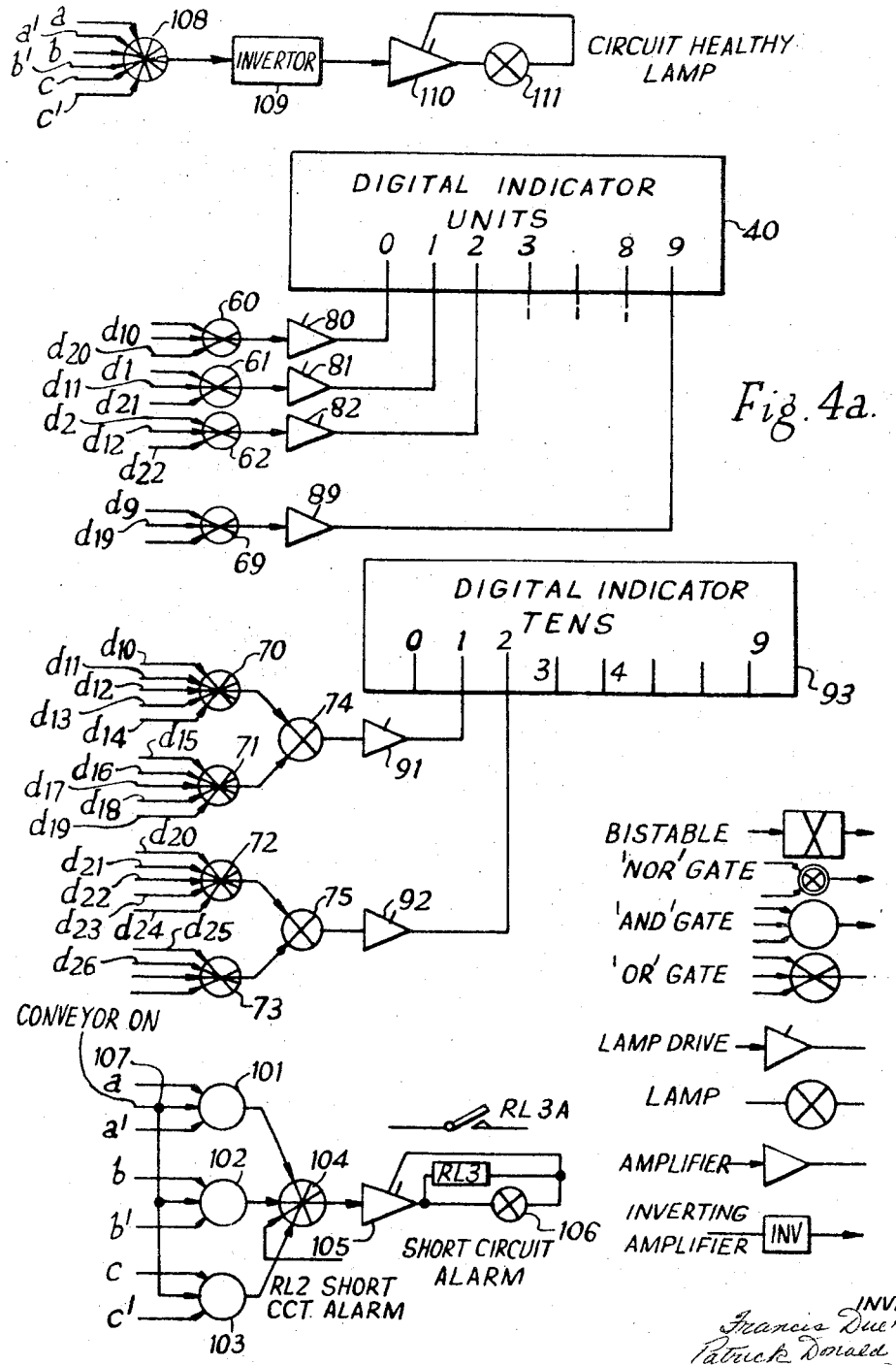

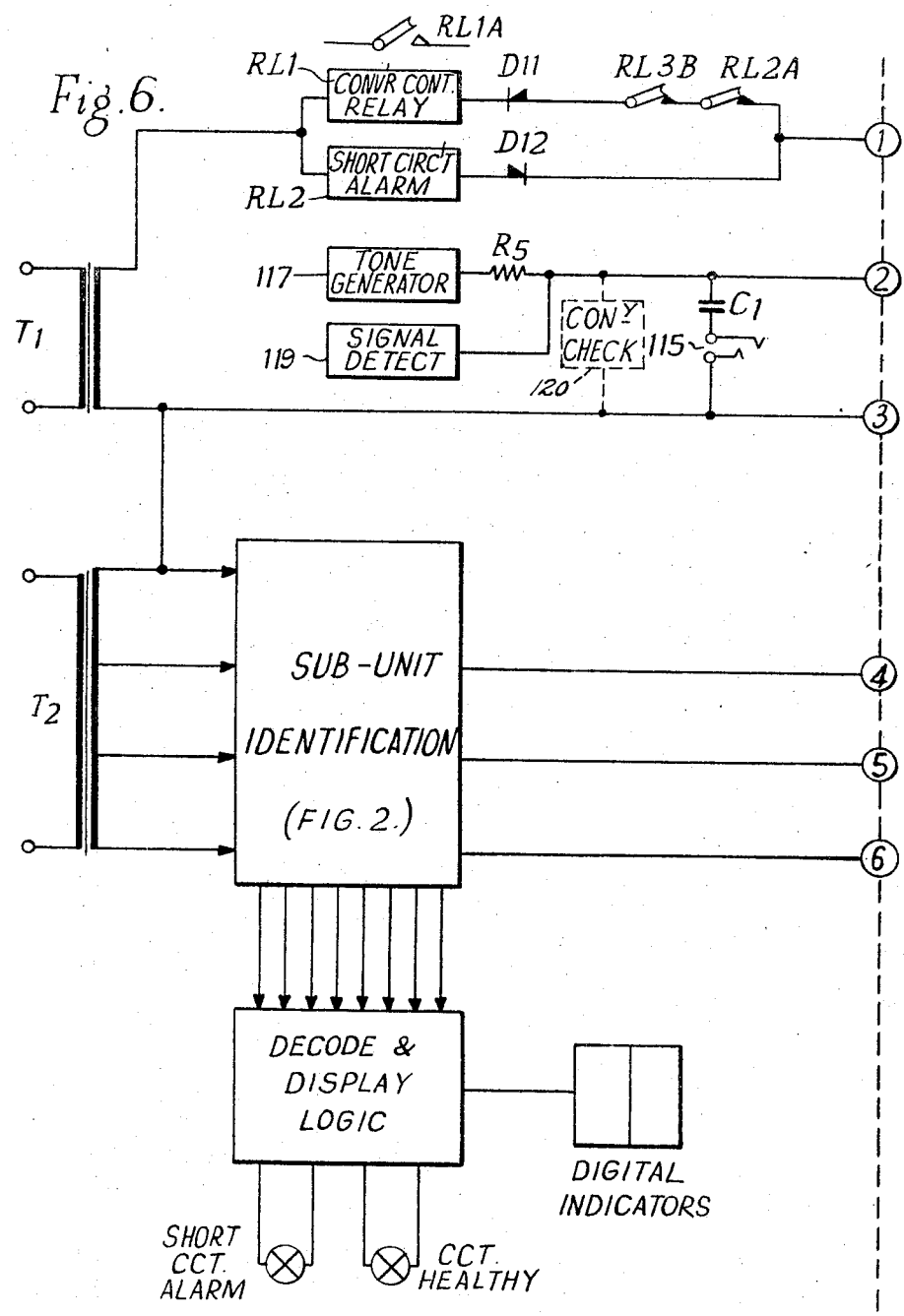

United States Patent Office 3,382,322
Patented May 7, 1968

3,382,322
APPARATUS FOR ELECTRICALLY IDENTIFYING
ONE OF A NUMBER OF STATIONS
Francis Duerden and Patrick Donald Allen, Harlow,
England, assignors to A. C. Cossor Limited, Harlow, England
Filed Dec. 7, 1964, Ser. No. 416,199
Claims priority, application Great Britain, Dec. 20, 1963,
50,471/63
18 Claims. (Cl. 179—2)

ABSTRACT OF THE DISCLOSURE

A system is described in the hereinafter specification for indicating at which one of a number of stations located along a conveyor a switch has been operated. Each station is provided with a combination of rectifiers which are connected to a small number of energized conductors joining the stations to a control station. When a switch at a station is operated currents unique to that station are caused to flow and the station can be automatically identified from these currents. Facilities are also provided for stopping a conveyor and speaking by telephone to the station at which an emergency has occurred.

---

Figure 1:
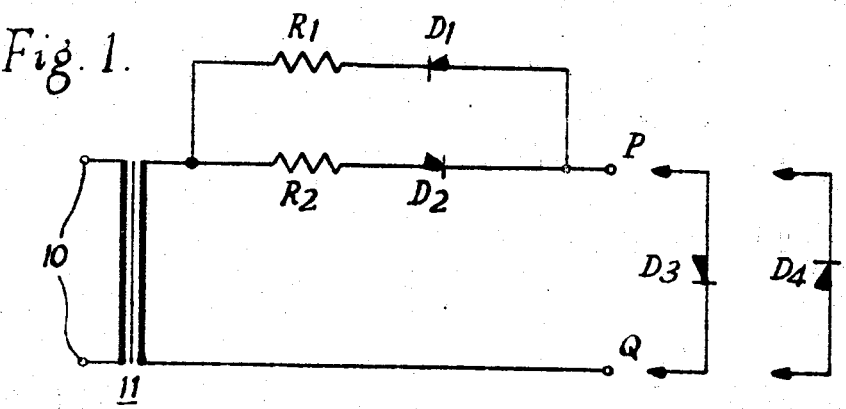

The present invention to apparatus for electrically identifying one of a number of stations, particularly in mines where the stations are sited alongside a conveyor.

The invention is also concerned with providing a means for stopping such a conveyor from any one of the stations and providing a telephone and calling system between the stations and a control station at one end of the conveyor.

In modern coal mines conveyors working along the coal face may be about 400 yards long. In emergencies it must be possible to stop the conveyor at points along the conveyor. One of two methods is commonly used for stopping: the push-button method where switches at the stations are operated or the pull-wire method where pulling a wire operates a switch at the stations. The statuatory minimum distance between the stations where the conveyor can be stopped is 7 yards for the push-button system and 20 yards for the pull-wire system.

In one known pull wire system A.C. is passed down a line between the stations and a switch is operated which connects a diode across the line. The resulting uni-directional current operates a control relay and stops the conveyor. The connection in the other sense of another diode causes another relay ot operate giving a warning signal, such as a Klaxon at the control station. A disadvantage of this system is that the station from which the conveyor is stopped cannot be identified at the control station.

According to the present invention here is provided an apparatus for identifying electrically one of a number of stations having at least two wires connected between the stations, one or more switches at each station operable to so connect a rectifier or a combination of rectifiers between the wires that with an electrical source connected to the wires currents unique to that station flow through the wires when the switches are operated, and means for detecting which currents are flowing in the wires to identify the station.

The identification apparatus may be part of a conveyor control system wherein the stations are spaced along the side of the conveyor and each station has a further switch which may be mechanically connected to the other switch at the station, operation of the further switch stopping the conveyor.

The identification apparatus may have four wires connecting the stations, the switches at the stations being adapted to connect each rectifier between two of the wires.

The apparatus may include a transformer having an alternating voltage applied to its primary winding and having three secondary windings connected in series, one of the four wires being connected to one end of the combination of secondary windings so formed, one wire to the other end of the combination of secondary windings and each of the other two wires to one of the junctions between windings, each of the three last mentioned wires being connected to the secondary windings through two circuits, connected in parallel, each consisting of a rectifier in series with a resistor or the primary winding of a further transformer. For each of the three wires, the rectifiers in the two parallel circuits are connected in opposing senses to one another and serve to detect which currents flow in the wires.

The transformer, and the parallel circuits are located at a control station which may be at one end of the wires.

Connection of a rectifier or a rectifier combination at one of the stations thus results in current flow through one or more of the rectifiers at the control station which produces a voltage or voltages across one or more of the resistors or the secondaries of the further transformers, enabling the station to be identified at the control station.

Voltages which are induced in the further transformers or resistors may be passed to a first series of gates opened to allow only the voltages resulting from the first operation of any of the switches to pass. The voltages set one of a series of bistable circuits each corresponding to a station. The outputs of the bistable circuits are coupled to a display unit which displays a code corresponding to the station at which the first switch was operated. A second series of gates may be interposed between the first series and the bistable circuits. Each bistable circuit having been set prevents its corresponding gate in the second series from passing further voltages until a reset switch resetting (directly or indirectly) the bistable circuits is operated, the first series of gates also being temporarily reopened by the reset switch. The gates in the first series may be opened by a relay at the control station shortly after the conveyor is stopped.

The conveyor control system may also comprise a further pair of wires connecting the stations and which, when connected together, allow the motor operating the conveyor to operate, the operation of one of the further switches at a station interrupting either or both of the further wires halting the conveyor.

One of the further wires may be used, together with an additional wire connected between the stations, for a telephone circuit. A jack socket may be connected between the telephone wires in series with a capacitor, and a continuous tone applied to the wires which is removed by operating a calling switch at any of the stations to call the control station. The absence of the tone causes an indication of calling to be given. The word station in the specification and claims means a specific location.

Figure 5:
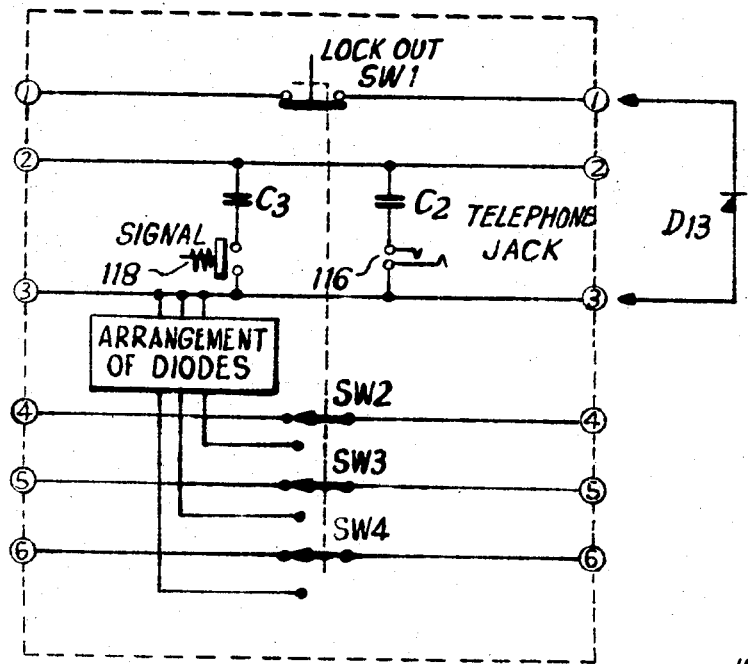
Figure 3:
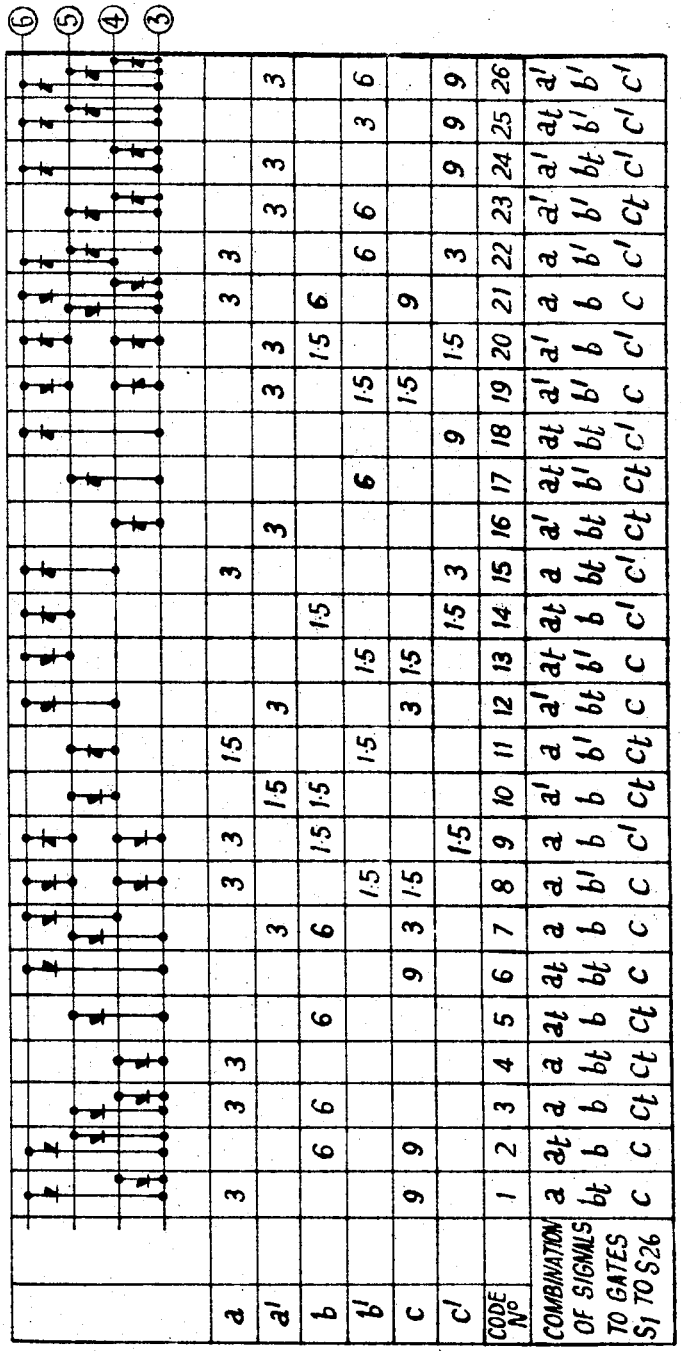

Certain embodiments of the invention will now be described, by way of example only, with reference to the accompanying drawings, in which, FIG. 1 is a circuit diagram illustrating the principle used to identify stations, FIG. 2 is a diagram of a circuit for identifying stations, FIG. 3 is a table showing the combinations of diodes or rectifier connections at each station and the magnitude of outputs at the control station resulting from each of these combinations, FIGS. 4a and 4b are together a combined logic and circuit diagram for decoding the above mentioned outputs at the control station, FIG. 5 is the circuit diagram of a station, and FIG. 6 is a block diagram of the control station.

In FIG. 1 two wires P and Q run alongside a conveyor in a coal mine. At some point or station a diode D3 can be connected across the wires and at some other point or station, a diode D4 can be connected across the wires. At a control station a transformer 11 fed from a 50 c.p.s. A.C. supply through terminals 10 is connected through diodes D1 and D2, and resistors R1 and R2 to the wires P and Q.

When the diode D3 is connected a current flows through the resistor R2 and the diode D2. Similarly, when the diode D4 is connected current flows through the resistor R1 and the diode D1. By measuring whether or not a voltage appears across the resistors R1 and R2 it is possible to decide whether, and at what points or stations, diodes have been connected.

FIGS. 2 and 3 show how this system can be extended to identify one of 26 stations. In FIG. 3, 26 different ways of connecting one, two or three diodes between four wires 3, 4, 5 and 6 are shown.

Each station is allocated a code number which corresponds to a unique diode combination which can be connected at this station. In FIG. 3 the diode combinations are shown at the head of the columns which have at their foot the code number of the corresponding station.

The transformer 12 (FIG. 2) is equivalent to transformer 11 in the simple circuit. Its primary winding 13 is supplied from an A.C. source, and it has three secondary windings 14, 15 and 16 which are connected in series. The wire 3 is connected to one end of winding 14 and the junction of windings 14 and 15 is connected to the wire 4 through a resistance $R_a$ and two parallel circuits consisting of a diode D5 and the primary winding of a transformer 17 in series and a diode D6 and the primary winding of a transformer 18 in series to the wire 4. The wires 5 and 6 are similarly connected through diodes D7 to D10 and transformers 19 to 22 and resistors $R_b$ and $R_c$ to the junction of windings 15 and 16, and the other end of the winding 16 respectively. The resistors $R_a$, $R_b$ and $R_c$ are used to limit short circuit currents in case of a fault.

The connection at a station of a diode or combination of diodes between the wires will cause currents to flow through some of the primary windings of the transformers 17 to 22 and thus some output signals $a$, $a'$, $b$, $b'$, $c$ and $c'$ will appear across the secondary windings of these transformers. For instance, if the diode combination corresponding to the first station, code number 1, is connected, currents will flow through diodes D9 and D5. Thus output signals $a$ and $c$ will appear across the secondaries of transformers 17 and 21.

The output signals corresponding to each station are shown in the table of FIG. 3 and the relative magnitudes of these outputs are also given. For example, if we allocate 3 units to the voltage across each secondary winding of the transformer 12, the output $c$ corresponding to station 1 is of 9 units since the diode at station 1 is connected between the wires 6 and 3 and is across all three windings. The output $a$ is three units since the other diode at station 1 is only connected across one secondary winding of the transformer 12. The lowest output is 1.5 units. This occurs when the diode at a remote station is connected across one winding of the transformer 12 but has to drive two outputs. For example, the diode at station 11 drives two transformers 17 and 20 with two outputs $a$ and $b'$.

In the embodiment described the different magnitudes of outputs are not utilised but such utilisation is possible. The four wires could then be used to identify more than 26 stations.

Figure 4:
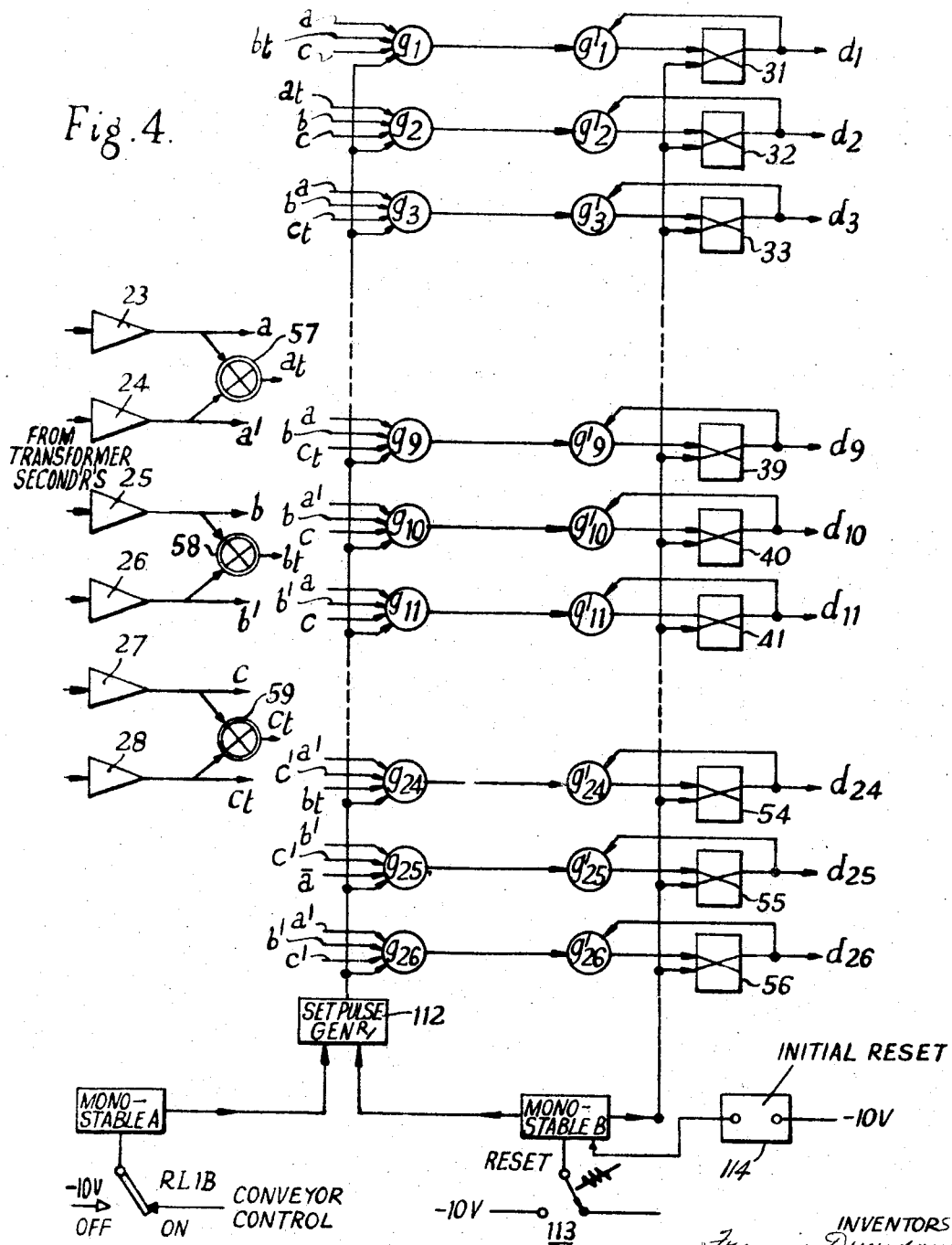

FIG. 4 is a logic diagram showing how the output signals $a$, $a'$, $b$, $b'$, $c$, $c'$, are used to display the number of a station when its diode combination is connected across the wires.

Any output signals $a$, $a'$, $b$, $b'$, $c$, $c'$ are passed through amplifiers 23 to 28 of different amplifications such that the output signals are then all of the same magnitude. The output terminals of the amplifiers 23 to 28 are connected in pairs to NOR gates 57, 58 and 59, so that an output signal $a_t$ or $b_t$ or $c_t$ is obtained from the NOR gates when the $a$ and $a'$, or the $b$ and $b'$, or the $c$ and $c'$ signals, respectively, are absent.

The table of FIG. 3 also shows the NOR gate outputs, and the combination of signals which is used to identify the station. Connections are made between the amplifier and NOR gate outputs and "and" gates $g_1$ to $g_{26}$ so that when a diode combination is connected at a station a combination of three amplifier and NOR gate outputs is received by one of the gates corresponding to that station. For example, the gate $g_1$ is connected to receive only signals $a$, $c$ and $b_t$ and so corresponds to station 1.

The NOR gates 57 to 59 allow the full twenty six ways of connecting the diodes to be used. Together with the amplifiers 23 to 28, they provide a unique combination of signals to gates $g_1$ to $g_{26}$ for each code, that is for each station. If a signal were not available to signify that any pair of signals $a$ and $a'$, $b$ and $b'$ and $c$ and $c'$ was absent then only a smaller number of codes could be used. As an alternative to the NOR gates inverters could be connected to the output terminals of three of the amplifiers, and signals from these inverters could be passed to the gates $g_1$ to $g_{26}$. Such an arrangement does not, however, allow the full 26 codes to be used.

The outputs of gates $g_1$ to $g_{26}$ are passed at certain times and under the control of certain pulses, as will be described later, through gates $g'_1$ to $g'_{26}$ and bistable circuits 31 to 56 to connections $d_1$ to $d_{26}$.

In another embodiment, the gates $g'_1$ to $g'_{26}$ are omitted and inputs to the bistable circuits come direct from the gates $g_1$ to $g_{26}$.

The connections $d_1$ to $d_{26}$ are connected to "or" gates 60 to 69 which operate, through lamp drive amplifiers 80 to 89, the lamps of a unit digital indicator 40. The connections $d_{10}$ to $d_{26}$ are also connected to "or" gates 70 to 73, which are themselves connected through "or" gates 74 and 75, and lamp drive amplifiers 91 and 92 to the lamps of a "tens" digital indicator 93.

The connections to the "or" gates 60 to 73 are so made that each of the gates $g_1$ to $g_{26}$ operates a display corresponding to its number. For example, the gate $g_{21}$ passes signals through the connection $d_{21}$ which is connected through the gates 72 and 75 to operate the "tens" 2 display and through the gate 61 to operate the "units" 1 display.

The circuit controlling the conveyor will now be described with reference to FIGS. 5 and 6. In the control station a transformer $T_1$ has a 50 c.p.s. A.C. source connected to its primary winding and supplies from its secondary a circuit energising two relays RL1 and RL2. This circuit is from one side of the secondary winding of the transformer $T_1$ through two parallel circuits (one consisting of the relay RL1, the diode D11 relay contacts RL3B and RL2A in series, and the other consisting of the relay RL2 in series with the diode D12) to a wire 1 connecting the stations and returns through a diode D13 (FIG. 5) in the station farthest from the control station and a wire 3 back to the other end of the secondary winding of the transformer $T_1$.

At all stations along the conveyor the wire 1 passes through a lock out switch such as SW1 (FIG. 5) whose contacts are open when the switch is operated but closed when it is released. If it is desired to stop the conveyor one of these switches is operated, releasing the relay RL1 and a contact RL1A which is in the control circuit of the conveyor and which when opened stops the conveyor. The lock-out buttons must all be released if the conveyor is to be run or re-started.

The sequence of events which occurs when a lock-out switch is operated will now be described. The lock-out switches are ganged to changeover switches SW2, SW3 and SW4 (see FIG. 5) which connect the diode combinations in such a way that the diode combinations are connected before the wire 1 is interrupted and the conveyor stops. This is necessary to ensure that the signals to the gates $g_1$ to $g_{26}$ are steady before the aforementioned pulse controlling these gates is generated, since stopping the conveyor provides the pulse through the contact RL1B (FIG. 4). It is therefore essential that the outputs $a$, $a'$, $b$, $b'$, $c$, $c'$, $a_t$, $b_t$, $c_t$ are received before the conveyor stops.

First the relay RL1 operates, moving its contact RL1B (FIG. 4) to a −10 volt supply. This causes a monostable circuit A to produce a 20 msec. pulse during which all the inputs $a$ to $c'$ have time to arrive and become steady before a set pulse generator 112 opens the gates $g_1$ to $g_{26}$. The outputs of these gates pass through the gates $g'_1$ to $g'_{26}$ and set the bistable circuits 31 to 56 which operate the display. When one of the bistable circuits changes its state it prevents further change of its state by closing its $g'$ gate. In any case further operation of lock-out switches cannot pass signals beyond the gates $g_1$ to $g_{26}$ until the set pulse generator 112 produces another pulse.

Since the switches SW2, SW3 and SW4 in the stations are of the change-over type, the display shows the code of the nearest station in which the switch SW1 has been operated.

A reset switch 113 is provided to set all the logic circuits to their normal condition (that is before any inputs are received). When operated, a −10 volt supply is connected to the monostable circuit B which operates the gates $g_1$ to $g_{26}$ in the same way as the monostable circuit A. If a second lock-out switch has been operated and the first lock-out switch released when the reset switch is operated, the number of the station of the second lock out switch will be displayed. If both lock-out switches are still operated the display will be that of the station nearest to the control station. The important feature of the system is that the first station's number is displayed until cancelled manually. No account need be taken of the possibility of two lock-out switches being operated simultaneously and thus a combination of station numbers being displayed since they would have to be operated within 20 milliseconds of one another, and this is virtually impossible even when two operators co-operate. If there are no lock-out switches operated when the reset switch is operated, that is the conveyor control circuit is complete, there will be no display, and the circuit healthy lamp will indicate that the conveyor may be started. If after a lock-out switch at a first station has been operated and its code displayed, that switch is released and a lock-out switch at another station is operated before the reset switch 113 is operated then the relay RL1 will first be energised again (the conveyor will not start due to external interlocks) and then released for a second time and gates $g_1$ to $g_{26}$ will superimpose the code of the second station on that of the first. This superimposition is not a false combination but rather a useful facility which allows the station causing the stoppage to be determined even if its lock-out switch is restored normal after the conveyor has stopped.

It can therefore be seen that any attempt by operators to make the apparatus give a false position indication is unlikely to succeed.

When the system is first switched on and the conveyor is to be started up the bistable circuits may take up either of their states. They are then set at start-up by an initial rest circuit 114 which operates the monostable circuit B. This is to ensure that if any lock-out switch is already operated when the system is switched on, this shall be displayed.

The wires 1 to 6 are usually all enclosed in a cable and it is necessary to know when damage occurs to the cable. Damage causing short circuits between the wires 1 and 3 is potentially dangerous because it would prevent the conveyor being stopped from a station beyond the short circuit. However, shorting of the wires 1 and 3 causes the relay RL2 to operate, breaking its contact RL2A, thus releasing the relay RL1 and stopping the conveyor. If there is a partial short-circuit between the wires, having a current sufficient to hold the relay RL1 energised, then the relay RL2 will operate, on the same magnitude, but opposite direction of current. (The relays RL1 and RL2 are of identical construction.) The operation of the relay RL2 stops the conveyor, and can also be made to operate an alarm.

If a short or partial short-circuit of any two of the wires 3 to 6 occurs one or two of the pairs of outputs $a$, $a'$, $b$, $b'$ or $c$, $c'$ will be given. The apparatus is designed so that the connection of a diode combination at any station or stations will not cause such a pair of outputs to be given. Thus a short-circuit alarm circuit is provided by passing a pair of outputs to one of "and" gates 101 to 103 (FIG. 4) and then through an "or" gate 104, to a lamp amplifier 105 which operates a relay RL3 and a short-circuit alarm lamp 106. The contact RL3A of the relay RL3 can be used to operate any other alarm circuit. An input to the gates 101 to 103 is provided at point 107 when the conveyor is working and the absence of this input when the conveyor is stopped prevents false alarm through two stations' diode combinations being connected and giving a pair of inputs. The contact RL3B (FIG. 6) is opened and the conveyor stopped.

An "or" gate 108 (FIG. 4) feeds an inverter 109 and so lights a "circuit healthy" lamp 111, through a lamp amplifier 110 if there are no inputs from outputs $a$, $a'$, $b$, $b'$, $c$ and $c'$.

Having explained how the apparatus reacts to damage causing a short-circuit on the cable, the effect of damage causing an open circuit will now be briefly mentioned. Since the principle of identification of the apparatus depends on some selected signals being normally absent, an open circuit prevents identification signals being received. However, since an open circuit in wires 1 or 3 has the same effect as operating a switch such as SW1, the conveyor will stop. This is an important safety feature.

An additional wire 2 (FIGS. 5 and 6) is used with wire 3 for a telephone circuit. At the control station a telephone jack socket 115 in series with a capacitor $C_1$ is provided and a similar arrangement with jack socket 116 and capacitor $C_2$ is provided at each other station. Sound powered telephones can be connected to these jack sockets and speech communication established between the control station and any other station or between stations, even if a lock-out button is operated. In another embodiment, capacitors $C_1$ and $C_2$ are omitted.

A tone generator 117 applies a sinusoidal tone of 20,000 c.p.s. to the wires 2 and 3 for ringing purposes. A switch 118 is used, when it is desired to call the control station from another station, to short these wires together through a capacitor $C_3$ of low impedance at 20,000 c.p.s. compared with the generator impedance $R_5$, this removing the tone on the wires. The absence of the tone on the wires is detected by a circuit 119 which gives the calling signal. The 20,000 c.p.s. tone cannot be heard in the telephone sets because of their restricted high frequency response. In another embodiment the capacitors $C_3$ are omitted.

A continuity checker 120 (FIG. 6) may be connected between the wires 2 and 3 to give an alarm if wire 2 is cut and the speech and signalling circuits are broken.

An alternative embodiment of the system uses the pull wire arrangement. In this case the six-core cable, as used in carrying out the previous embodiment, may be laid in the conveyor cable trough and the conveyor controlled by the pull wire. Alternatively, the six-core cable may itself be used as the pull-wire. In either case the design of the control station will be the same except for any circuits added to utilise and check the continuity of the pull-wire.

In its application to mining where stringent requirements of safety apply, the arrangement of FIG. 6 may be modified to provide a single transformer instead of the transformers $T_1$ and $T_2$ the secondary of which is tapped to provide a connection for the common wire 3. By this means the secondary voltages of the two separate transformers can never cause short-circuit currents in excess of those permissible.

In addition to its use in coal mines, the combined conveyor and station location apparatus may be used in quarries or gas works, for instance. If the lock out switches are replaced by transducers the position of equipment such as coal cutters in coal-mines can be ascertained with the minimum number of cable cores.

One of the advantages of the apparatus is that it is economical in cable costs since only a few cores are required to identify a large number of stations.

What is claimed is:

1. An apparatus for identifying electrically one of a number of stations comprising,
    at least two wires connected between the said stations,
    means connected to said wires for applying a voltage between said wires,
    rectifier means, at each of the said stations, unique for each station,
    switch means at each of the said stations operable to so connect the said rectifier means between the said wires that currents unique to that station flow through the said wires, and
    means for detecting which currents flow in the wires to identify each of the said stations.

2. An apparatus according to claim 1 including,
    a control station at which the said means for detecting which currents are flowing is located, and
    a number of subsidiary stations at which the said switch means are located.

3. An apparatus according to claim 1 wherein there are four of the said wires between the stations, and the said rectifier means at each of the said stations includes up to three rectifiers, each of which can be connected through the said switch means between two of the said wires.

4. An apparatus according to claim 3 wherein three of the said wires are connected through the said switch means at the stations, whereby when the said switch means at a station is operated to connect the said rectifier means the said three wires are interrupted at that station.

5. Apparatus according to claim 3 including,
    a transformer for connecting an alternating voltage source to the apparatus; and wherein,
    the said means for detecting which currents flow include,
    three pairs of parallel circuits, the parallel circuits of each pair serving to detect currents flowing in opposite directions,
    and the said transformer having three secondary windings connected in series, the two ends of the series combination of secondary windings so formed and the two junctions between the said secondary windings being each connected to a different one of the said four wires, and three of the wires being each connected to the said secondary windings through one of the said pairs of circuits of the said current-detecting means.

6. An apparatus according to claim 5 wherein each of the said circuits connected in parallel consists of a rectifier in series with a resistor, the said rectifiers in each pair of the said parallel circuits being connected in opposite senses to one another.

7. An apparatus according to claim 5 wherein each of the said circuits connected in parallel consists of a rectifier in series with a further transformer, the said rectifiers in each pair of the said parallel circuits being connected in opposite senses to one another.

8. An apparatus according to claim 7 wherein the said means detecting which currents flow include,
    a first series of gates coupled to the said further transformers whereby only one of the said gates receives signals allowing it to operate when currents unique to one of the said stations flow in the said wires, the said one gate therefore corresponding to the said one station.

9. An apparatus according to claim 8 wherein the said means detecting which currents flow include,
    a series of bistable circuits each coupled to one of the said gates in the first series, and
    a display means, coupled to the said series of bistable circuits, capable of displaying characters in a code identifying the stations whereby when one of said gates changes the condition of the said bistable circuit coupled thereto, signals from the said bistable circuit set up the code of the station corresponding to the said one gate, in the said display means.

10. An apparatus according to claim 9 wherein,
    a second series of gates is interposed between the said gates of the first series and the said bistable circuits, there being one gate of the said second series between each gate of the said first series and its said corresponding bistable circuit, and the gates of the said second series are connected to prevent the passing of signals when the said bistable circuits to which they are connected are in the condition causing a code to be set up in the said display means, and
    means being provided to return the said bistable circuits, when required, to their other condition.

11. An apparatus according to claim 9 including,
    a series of NOR gates, and
    a series of amplifiers connected between the said further transformers and the said first series of gates, each of the said NOR gates being connected to receive signals from a pair of the said amplifiers, and each of said pairs of amplifiers being separately connected to the said further transformers in a pair of the said circuits connected in parallel, whereby if no currents flow in either of the said wires then one of the said NOR gates passes a signal to at least one of the said gates in the first series.

12. A conveyor control system incorporating an apparatus according to claim 1 wherein the said stations are located at spaced intervals along the conveyor, and at each of the said stations the said switch means includes a conveyor control switch which when operated stops the said conveyor, and whereby when the conveyor-control switch at one of the said stations is operated, the rectifier means at the said one station is connected to the said wires and the said one station can be identified.

13. A conveyor control system incorporating an apparatus according to claim 5 wherein the said stations are located at spaced intervals along the conveyor, and at each of the said stations the said switch means includes a conveyor control switch which when operated stops the said conveyor, and whereby when the conveyor-control switch at one of the said stations is operated, the rectifier means at the said one station is connected to the said wires and the said one station can be identified.

14. A conveyor control system incorporating an apparatus according to claim 11 wherein the said stations are located at spaced intervals along the conveyor, and at each of the said stations the said switch means includes a conveyor control switch which when operated stops the said conveyor, and whereby when the conveyor-control switch at one of the said stations is operated, the rectifier means at the said one station is connected to the said wires and the said one station can be identified.

15. A conveyor control system according to claim 14 including,
    an additional wire connecting the said stations which when connected to one of the other wires (together) allows the conveyor to operate, and wherein the said conveyor-control switches are so connected that when operated they interrupt the additional wire, so stopping the said conveyor.

16. A conveyor control system according to claim 15 wherein a second additional wire and one of the other wires are used for a telephone circuit between the stations.

17. A conveyor control system according to claim 16 including,
    means for applying a continuous tone across the wires used for the telephone circuit, and in which each of the said stations has a calling switch to remove the said tone and thus call a control station.

18. A conveyor control system comprising,
a control station,
a number of subsidiary stations,
six wires connecting the said control station with the said subsidiary stations,
rectifier means at each of said subsidiary stations, having up to three rectifiers, and the connection of rectifiers of the said rectifier means being unique for each of said stations,
switch means at each of said subsidiary stations which when operated interrupts a first of the said wires stopping the said conveyor, and also interrupts three other wires of the said wires so connecting the said rectifiers between the said three wires and a fifth of the said wires that currents unique to that station flow through the said wires,
means for detecting which currents flow and so identify the said subsidiary stations including,
three pairs of parallel circuits, consisting of a rectifier in series with one of a rectifier in series with one of a series of transformers,
the said rectifiers in each pair of the said parallel circuits being connected in opposite senses to one another,
a transformer for connecting an alternating voltage source to the apparatus, the said transformer having three secondary windings connected in series, the two ends of the said secondary windings and the two junctions between the said secondary windings being each connected to a different one of the said three wires and the said fifth wire, and three of these wires being each connected through one of the said pairs of circuits,
a series of amplifiers coupled to the transformers of the said series,
a series of NOR gates, each of which is connected to a pair of the said amplifiers, and each of said pairs of amplifiers being separately connected to the transformers, of the said series, in a pair of the said parallel circuits, whereby if no currents flow in one of the said three wires or the fifth wire one of the said NOR gates provides an output signal,
a first series of gates coupled to the said amplifiers and the said NOR gates whereby only one of the said gates receives signals allowing it to operate when currents unique to one of the said stations flow, the said one gate therefore corresponding to the said one station,
a second series of gates, each gate of which is individually connected to a gate of the said first series,
a series of bistable circuits, each circuit of which is individually connected to a gate of the said second series, the gates of the second series being connected to prevent the passing of signals when the said bistable circuits are in a first condition,
means for changing when required, the said bistable circuits from their said first condition to a second condition,
display means coupled to the said series of bistable circuits, capable of displaying characters in a code identifying the stations whereby when in response to signals from the said amplifiers and said NOR gates, one of the said gates in the first series changes the said bistable circuit coupled thereto, from its said second condition to its said first condition, via a gate in the said second series, the code of the station corresponding to the said one gate is set up in the display means, and
the conveyor control system further comprising a telephone circuit using the sixth wire and the fifth wire,
means being provided to connect a telephone set at each one of the said subsidiary stations,
means for applying a continuous tone across the fifth and sixth wires, and
means at each one of the said subsidiary stations to remove the said tone and thus call the said control station.

References Cited

UNITED STATES PATENTS 2,424,243 7/1947 Lowell _____ 340—147
2,741,755 4/1956 Galanty _____ 340—176 X ROBERT L. GRIFFIN, *Primary Examiner.*

JOHN W. CLADWELL, *Examiner.*

J. T. STRATMAN, *Assistant Examiner.*